US007627491B2

(12) United States Patent
Feyen et al.

(10) Patent No.: US 7,627,491 B2
(45) Date of Patent: Dec. 1, 2009

(54) METHOD FOR EVALUATING FLOOD PLAIN RISKS

(75) Inventors: Hans Feyen, Zürich (CH); Jens Mehlhorn, Zürich (CH); Ivo Menzinger, Munich (DE)

(73) Assignee: Swiss Reinsurance Company, Zurich (CH)

( * ) Notice: Subject to any disclaimer, the term of this patent is extended or adjusted under 35 U.S.C. 154(b) by 1084 days.

(21) Appl. No.: 10/753,150

(22) Filed: Jan. 7, 2004

(65) Prior Publication Data

US 2004/0199410 A1    Oct. 7, 2004

Related U.S. Application Data

(60) Provisional application No. 60/438,378, filed on Jan. 7, 2003.

(51) Int. Cl.
    *G06Q 10/00*    (2006.01)
(52) U.S. Cl. ..................... 705/4; 705/2; 705/3
(58) Field of Classification Search ................. 705/2–4
    See application file for complete search history.

(56) References Cited

U.S. PATENT DOCUMENTS 6,490,573 B1 * 12/2002 Njemanze .................. 706/19

2002/0010572 A1 * 1/2002 Orton et al. ................ 703/22

OTHER PUBLICATIONS

"New River Flood Catastrophe Model for the U.K. Quantifies Flood Risk for Insureres and Reinsurers; Markets Respond to Costly Flood Losses in 2000" Business Wire, Oct. 11, 2001. (From Dialog File 15: Gale Group® ).*
"Flood Risk-Rising waters, rising losses," Reinsurance, p. 24, Dec. 16, 2002. (From Dialog File 20: Dialog Global Reporter.).*
"What Flood? News' Newest Outlook Goes Virtually Unnoticed" by David Doods; Grand Forks Herald, Final Edition, Thursday, Feb. 21, 2002; p. 1.*

* cited by examiner

*Primary Examiner*—Vivek D Koppikar
(74) *Attorney, Agent, or Firm*—Oblon, Spivak, McClelland, Maier & Neustadt, L.L.P.

(57) ABSTRACT

A method for evaluating risks associated with flooding in a geographical region comprises the steps of defining the region, dividing the region into a plurality of grid cells, identifying data relating to characteristics of the region within the cells, determining a probability of occurrence of a flood related event in a selected grid cell using the identified data, and determining an insurance premium for the risk. Certain embodiments are implemented using a computer, and involve reference to an alternative source of information regarding the occurrence of flood-related events in a geographical region. In one embodiment, a model is developed and calibrated by reference to data from a first geographic region, and subsequently used to determine the probability of occurrence of a flood event in a second region.

15 Claims, 4 Drawing Sheets

5  0  5  10  15 Kilometers

CEH 100 year flood extent

Geomorphologic Regression 100 year flood extent

~ 20

5 0 5 10 15 Kilometers

▬▬ CEH 100 year flood extent

▒▒▒ Geomorhologic Regression 100 year flood extent

METHOD FOR EVALUATING FLOOD PLAIN RISKS

RELATED APPLICATIONS

The present application is related to and claims priority to U.S. Provisional Patent Application Ser. No. 60/438,378, filed on Jan. 7, 2003, entitled "Method and System for Evaluating Flood Plain Risks." The subject matter disclosed in that provisional application is hereby expressly incorporated by reference into the present application.

FIELD OF THE INVENTION

The invention relates generally to risk evaluation and, more particularly, to methods for evaluating risks associated with flooding and damages caused thereby. The invention further relates to the management of such risks through the provision of insurance and the determination of insurance premiums.

BACKGROUND AND SUMMARY OF THE INVENTION

Areas near rivers and streams are at risk of flooding. To calculate an appropriate insurance premium for risks located in an area prone to flooding, information on the frequency of flooding is required. Flood data maps are available from historical flood events and from hydrological modeling studies for some few countries or portions of countries. Still, for most countries (or portions of countries) flood zones are often not available for the flood return periods (e.g., 50 years, 100 years, 250 years, 500 years, etc.) of interest.

One approach to estimating flood areas and frequencies in the absence of historical data is hydrological modeling. This approach is complicated and time consuming, however, and can require months of computation time to develop an acceptable model for a particular region and/or country.

The present invention takes an alternative approach to traditional methods of estimating flood area and frequency. That approach is based upon a statistical estimation process. Inputs to the statistical process are variables which can be derived from digital terrain models (digitized, topological maps). Digital terrain models are available, or can be readily gathered, from a number of sources.

In one embodiment, the geographic region or country of interest is divided into grid cells. Digitized topological data are inputted for the region and the statistical "model" is used to generate output for each grid cell. The output may take the form of a "1" or "0" to indicate a "flooded" or "not flooded" condition, respectively, for a return period of interest (e.g., between 50 years and 500 years). In this approach, all grid cells having the same value for a return period of 100 years or less, for example, will define the 100 year flood zone.

In certain embodiments of the invention, return periods of 50 years, 100 years, 250 years and 500 years are utilized. Flood zones are defined for each of these return periods. Furthermore, with the invention it is possible to calculate the flood zones for any possible return period between 50 and 500 years. These flood zones are combined with other data and used in the underwriting process to evaluate property risks. That is, an underwriter can use the output of the system and method to determine the probable flooding frequency when underwriting insurance for a particular risk (e.g., a factory).

In certain embodiments of the invention, a model is developed for use in connection with a particular return period, and then used in determination of the probability of a flood occurrence in an alternative return period. For example, a model may be developed to determine the probability of occurrence of a 100-year flood event. Calibration data of good quality are available for multiple regions for the 100-year recurrence interval. For other return periods (for example, the 500-year return period), less data are available. In these embodiments, the 100-year model may be modified to approximate flood events for other return periods.

Additional features and advantages will become apparent to those skilled in the art upon consideration of the following detailed description of illustrative embodiments exemplifying the best mode of carrying out the method as presently perceived.

BRIEF DESCRIPTION OF DRAWINGS

The present disclosure will be described hereafter with reference to the attached drawings which are given as non-limiting examples only, in which.

DETAILED DESCRIPTION

Figure 1:
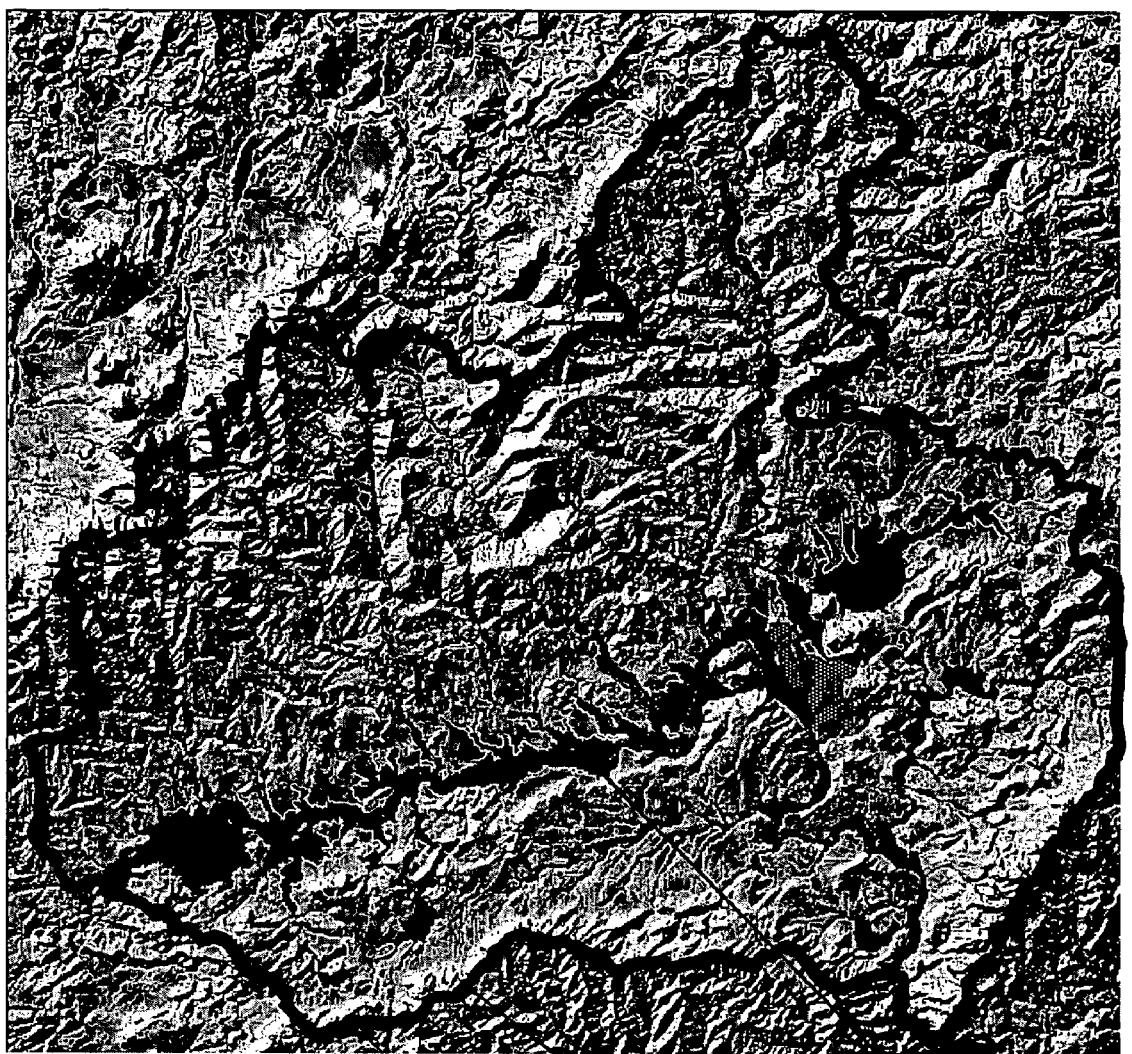
FIG. 1 is an aerial view of a geographical region which includes a portion of a river network and its catchment area.

FIG. 1 is an aerial view of a geographical region which includes a portion of a river network and its catchment area. The dark areas indicated, for example, by reference numeral 12 represent the 100-year flood extent of the river, as determined by a prior art hydrological model. The particular area shown in FIG. 1 is the Upper Thames basin in England. The information in FIG. 1 was provided by the Centre of Ecology and Hydrology (formerly the Institute of Hydrology). The region surrounded by boundary 14 in FIG. 1 represents the catchment area of the Upper Thames basin, and covers an area of approximately 4100 km$^2$. As previously noted, hydrological modeling has been used in the past for producing estimates of flood extent, such as that shown in FIG. 1. However, this approach is complicated and time consuming, and is not readily available in all regions and/or countries.

The present invention is based upon a new model called Geomorphologic Regression. It is so named since it uses the method of multiple regression and geomorphologic catchment attributes as independent parameters. Instead of calculating flood depths first and then translating them into flood extent (as was done, for example, to produce the estimates shown in FIG. 1), this new approach determines 100-year flood zones directly. Like prior models, the new approach does use catchment characteristics and digital terrain data, as will be described more fully below.

The assumptions underlying the Geomorphologic Regression model are that naturally flowing rivers shape their channel and flood plain according to their basin inherent forces and characteristics, and that the flood water extent strongly depends on the shape of the flood plain. For example, in v-shaped valleys, one would expect high water levels, but a relatively small flood extent. On the other hand, in lowland flood plains, the flood extent might be large, but water levels are relatively low. In the latter, small differences in elevation may be sufficient to prevent flooding of particular areas.

The inherent forces of a river can be described by flood water volume and catchment descriptors, such as catchment area and slope. Flood water volume can also be described by catchment attributes, including climate and other rainfall information. The characteristics of a particular location in respect to its situation inside a flood plain can be defined by a vertical distance and a horizontal distance of the subject location from the subject river.

A basic idea underlying the Geomorphologic Regression model is the use of already existing digital flood maps for model building to avoid the difficulties associated with estimation of flood depth. A good source of digital flood maps are the Q3 Flood Data Maps of the U.S. Federal Emergency Management Agency (FEMA). These maps are developed by scanning and vectorizing the existing hard copy Flood Insurance Rate Maps (FIRM). The FIRMs present flood risk information based on historic, meteorological, hydrologic and hydraulic data, as well as open space conditions, flood control works and development. The basic information drawn in the FIRMs are those areas subject to inundation by flood that has a one percent or greater chance of being equaled or exceeded during any given year. These areas are equal to the 100-year flood extents. This so-called base flood is a regulatory standard used by federal agencies, and most states, to administer flood plain management programs, and is also used by the National Flood Insurance Program as the basis of insurance requirements nationwide.

The digital Q3 maps are available for almost 80 percent of the urbanized areas in the United States. Since Geomorphologic Regression should model the 100-year flood extent for naturally-flowing rivers, areas had to be found where flood protection measures did not confine the natural spreading of flood water on the flood plain. Most areas shown in Q3 flood maps are populated, and naturally-flowing rivers are difficult to find in such areas. However, six regions were identified in which Q3 maps showed flood extents of naturally-flowing rivers. These areas are listed in Table 1.

TABLE 1

Characteristics of Calibration and Validation Areas for Geomorphologic Regression

| No. | Name | AREA (km²) | Climate |
|---|---|---|---|
| 1 | Oregon 1 | 30-500 | humid |
| 2 | Oregon 2 | 30-1,500 | humid |
| 3 | Colorado | 20-25,000 | semi-arid |
| 4 | Louisville/Nebraska | 220,000 | semi-arid |
| 5 | Platte/Nebraska | 153,000 | semi-arid |
| 6 | Red River/N. Dakota | 75,000 | humid |

The six regions represent river systems ranging from headwater to river basins of more than 200,000 km². Climates are either humid or semi-arid, as indicated in Table 1. The USGS 1:24K digital elevation model was used to determine catchment characteristics for the subject areas. The 1:24K digital elevation model has a horizontal and vertical resolution of 30 meters and 1 meter, respectively.

The known flood layers from the Q3 maps for the areas listed in Table 1 can be used to calibrate the Geomorphologic Regression model. The challenge in development of the model was to find a function that determines, on the basis of catchment characteristics, whether a certain location is flooded or not for a defined return period. For this problem, a binary response is sufficient to indicate the flooded/not flooded condition of a particular location in a grid. Binary response analysis models the relationship between a binary response variable and one or more explanatory variables. For a binary response variable Y, it assumes: $g(p)=\beta'x$, where:

$p=\text{Prob}(Y=y_1)$ for $y_1$ as one of two ordered levels of Y
$\beta$=parameter vector
x=vector of explanatory variables
g=function of which p is assumed to be linearly related to the explanatory variables The binary response model shares a common feature with linear models in that a function $g=g(\mu)$ of the mean $\mu$ of the dependent variable is assumed to be linearly related to the explanatory variables. The function $g(\mu)$, often referred as the link function, provides the link between the random or stochastic component and the systematic or deterministic component of the response variable. For the binary response model, logistic and probit regression techniques are often employed. The logistic regression has the form:

$$logit(p) \equiv \log\frac{p}{p-1} = (\beta'x)$$

or equivalent:

$$p = \frac{\exp(\beta'x)}{\exp(\beta'x)+1}$$

The logistic regression models the logit transformation of the ith observation's event probability, $p_i$, as a linear function of the explanatory variables in the vector $x_i$. The logistic regression model uses the logit as the link function.

During the calibration process, many different catchment descriptors were used as dependent variables. However, it could be shown that with a minimum number of three parameters, the outcome of whether a particular location or grid cell is flooded or not could be modeled sufficiently well when climatic differences were taken into account. This discovery lead to two different final models—one for humid climates and a second for semi-arid climates. The general form of the models is:

$$logit(p)=b_0+b_1 VDIST+b_2 HDIST+b_3 AREA$$

where
p=probability that grid cell is flooded
VDIST=vertical distance of grid cell to relevant river grid cell
HDIST=horizontal distance of grid cell to relevant river grid cell
AREA=catchment area at relevant river grid cell For calibration and validation, data sample splitting was used. The Geomorphologic Regression models the flood extent for the validation data which was not used in the calibration process with the same degree of "goodness" as for the calibration data.

As noted, several independent variables descriptive of characteristics of the catchment were evaluated. These include horizontal and vertical distance of a particular location or grid cell from a grid cell located at the nearest river, the catchment basement area, river length, basin form, slope, height, climatic region, and land use factors. The effect of the above listed variables on the outcome of whether a particular location or grid cell is flooded or not, is highly nonlinear. For that reason the statistical model above was estimated as a piecewise linear model (multi-variate automated regression splines, or MARS). In other words, depending on the actual value of the variables, other model parameters apply. It was found that, using the formula listed above, a model based upon the three factors of horizontal distance, vertical distance, and area produced significantly and unexpectedly better results than the null model.

Figure 2:
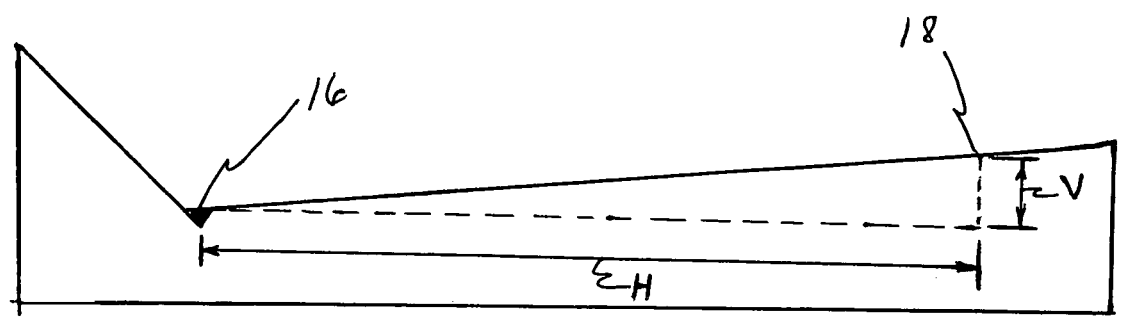
FIG. 2 shows a schematic cross section through a river bed and a portion of a catchment basin.

FIG. 2 illustrates two of these three variables. FIG. 2 shows a schematic cross-section through a river bed showing part of the catchment basin. As indicated in FIG. 2, grid cell location 18 is located a horizontal distance H away from, and a vertical distance V above a corresponding grid cell at river 16. Each grid cell in a particular area is evaluated in accordance with the above-referenced formula. Those grid cells associated with a value of 1 for a return period of 100 years or less are part of the 100-year flood event. Those grid cells associated with a value of 0 are not.

A more detailed discussion of one embodiment may be found in the document entitled "Calculation of Flood Zones Using Multi-Variate Automated Regression Splines (MARS)" which is a part of U.S. Provisional Patent Application Ser. No. 60,438,378, filed on Jan. 7, 2003, referenced above. As also noted above, the subject matter disclosed in that provisional application, including the discussion of the MARS methodology, is expressly incorporated by reference into the present application.

Figure 3:
FIG. 3 shows the results produced by the subject model in the geographical region of FIG. 1.

FIG. 3 shows the results produced by the subject model in the geographic region previously discussed in connection with FIG. 1. On the basis of the Institute of Hydrology digital terrain model, the parameters VDIST, HDIST, and AREA have been extracted and the 100-year flood extent for the Upper Thames catchment has been calculated according to the above equation with parameters $b_0$ to $b_3$ selected for humid conditions. As can be seen in FIG. 3, the 100-year flood extent as calculated by the Geomorphologic Regression technique compares well in most areas to that determined by the hydrologic model. Overall, the Geomorphologic Regression model estimates that 12.3 percent of the Upper Thames catchment would be inundated on average once in 100 years. The hydrologic model indicates that 11.4 percent of the area would inundated.

Despite the small difference in totally inundated area predicted by the two models, two clear differences are apparent in threatened areas when the flood layers are examined in more detail. First, in small catchments, the flood extent predicted by the Geomorphologic Regression model is broader than that of the hydrologic model. Such differences decrease with increasing catchment area. Second, for larger catchment areas, combined with relatively flat basins, the hydrological model predicts flood extents that are much broader than that predicted by the Geomorphologic Regression. This effect is apparent in the circled area identified by reference numeral 20 in FIG. 3.

To quantify the agreement between both flood extents, a goodness of agreement (GOA) factor has been defined as follows:

$$GOA = \frac{CEHandGeomorph}{CEHandGeomorp + CEH_{only} + Geomorph_{only}}$$

$CEHandGeomorph$ = No. of grid cells inundated by $CEH$ and Geomorphologic Regression $CEH_{only}$ = No. of grid cells inundated only by $CEH$ $Geomorph_{only}$ = No. of grid cells inundated only by Geomorphologic Regression The overall agreement between the flood extents predicted by both models is satisfactory. This illustrates the ability of the Geomorphologic Regression model to calculate flood extent in an area having a climate which corresponds to the climate of the area in which the model is calibrated. Thus, it is possible to use the Geomorphologic Regression model in other areas having that same climate, and for which a hydrologic model may not be readily available.

The major differences between the results of both models appear in small catchments where the Geomorphologic Regression model estimates broader flood extents than the hydrologic model. One reason for the differences may stem from the calibration data of the Geomorphologic Regression approach. As calibrated, the Geomorphologic Regression model would be expected to more accurately predict flood extent in medium-sized to large-sized catchment areas. For large size areas, the Geomorphologic Regression model may produce even better results than the hydrologic model, since it uses the parameters VDIST and HDIST. The HDIST parameter prevents the model from unrealistically extending the flooded area in regions with extremely flat relief. The combination of both parameters can be seen as a flood volume control which is non-existent in the hydrologic model.

It is not possible to say which model estimates the 100-year flood extent better, since the actual extents are not known. However, the hydrologic model uses rainfall and soil data and, therefore, is more flexible in representing local characteristics. However, this model is harder to apply in regions where such data are not available. In addition, a weakness of the hydrologic model is the non-existence of flood volume control, which can result in unrealistically broad flood extents in regions with low relief. This effect may be especially pronounced in low land flood plains of large river systems.

The above embodiment is discussed in the context of a 100-year flood extent. However, other recurrence periods may be used. In particular, a 500-year flood extent may be calculated on the basis of the existing Geomorphologic Regression model equations referenced above. Specifically, the result of the Geomorphologic Regression equation is the probability of a grid cell of a digital terrain model being inside a 100-year flood zone. The threshold for the 100-year flood extent is set to a probability of 0.5. That means that all grid cells having a probability greater than 0.5 form part of the 100-year flood extent.

One way to estimate the 500-year flood extent is to decrease the threshold. For example, decreasing the threshold from 0.5 to 0.3 may accurately estimate the 500-year flood extent. The appropriate threshold for a specific recurrence interval may be determined by comparing the calculated probabilities using various thresholds to the outline of a known 500-year (or other period) flood extent. Data are available in certain areas which would allow such recalibration of the model. For example, the Q3 map data comprises 500-year flood extents for some areas, and thus, could be used to determine an appropriate threshold value.

In the best case, calibration data of good quality are available for multiple regions and multiple return periods. This holds for 100-year flood data, but generally does not hold for 500-year data or data for other return periods. Thus, use of the 100-year model to approximate the probability of occurrence of flood events for other return periods is practicable and may be desirable for reasons of consistency and forecasting accuracy.

As illustrated and discussed in the MARS document referenced above, the model results show a steady decline of the probability of a flood event with increasing horizontal distance from a river. At some threshold p for the 100-year model, the results provided would more or less approximate the 500-year model. In one example from a region for which 500-year flood return period data are available, this point was reached at a threshold of p=0.35. Although questionable from a statistical point of view (given the lack of additional regions for confirmation), use of this approach allows for at least a rough estimate of 500-year flood event zones using a 100-year model. Any such application should be accompanied by a thorough examination of the model outcome. If possible, the results should be confirmed by application to an independent dataset of 100-year and 500-year data.

If it is assumed that the 100-year model having a first threshold (e.g., p=0.58) can approximate a 500-year flood zone by use of a second threshold (e.g., p=0.38), and if it is assumed that a linear relationship exists between the return period and the thresholds, thresholds for other return periods can be approximated. For example, in the example of the preceding sentence, thresholds of p=0.43 for a 250-year period, and p=0.83 for a 50-year period can be used. It is not recommended that such assumptions be accepted for periods shorter than 50 years or longer than 500 years.

Figure 4:
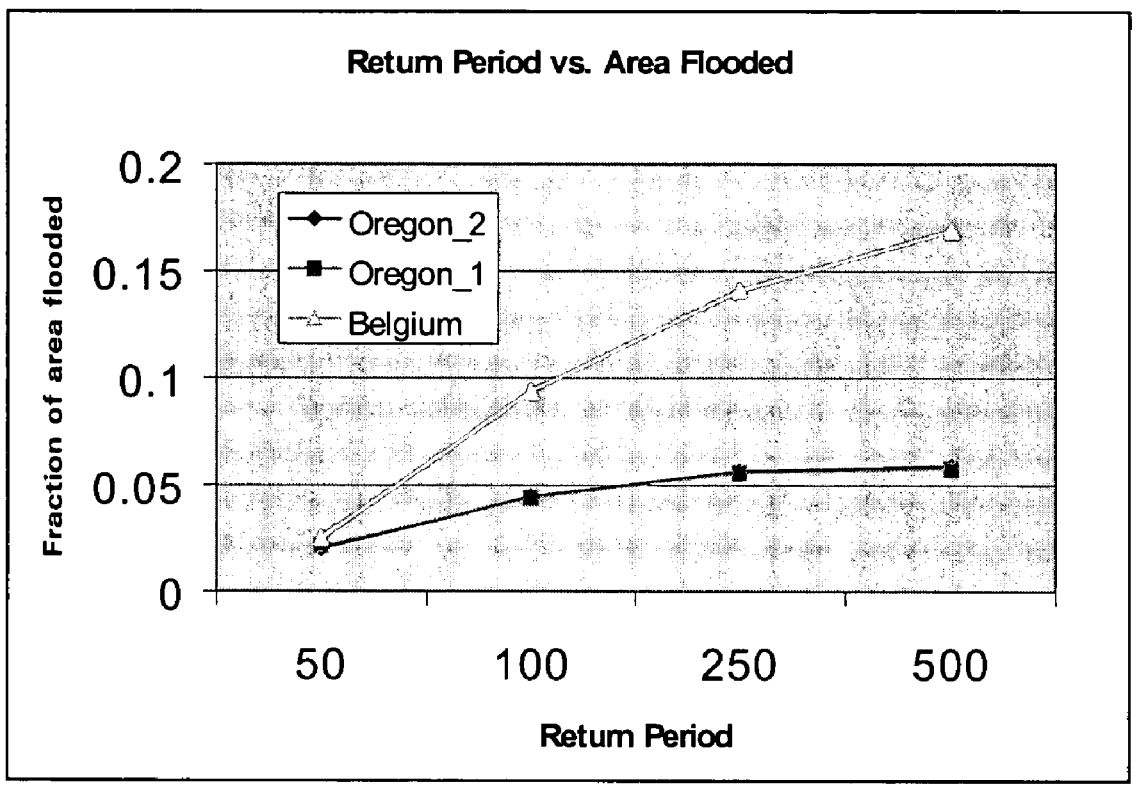
FIG. 4 shows a plot of return period versus area flooded, as calculated by one embodiment for three specific regions.

To check the assumption on linearity, calculations for three areas (2 in Oregon and 1 is Belgium) were made. FIG. 4 shows a graph of the results of this analysis. For all three areas, the results exhibit asymptotic behavior, starting at about 2.5% flooded area at 50 years. The two catchments in Oregon are steep, which results in relatively low fractions of flooded area as the return periods increase. The catchment in Belgium is relatively flat, resulting in a higher fraction of flooded area. The curves come together for the 50-year return period. This result occurs because, even in relatively steep regions, the area in the immediate vicinity of a river is in many cases relatively flat, causing the differences between steep and flat areas to decrease or disappear.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A method of evaluating risks performed on a computer associated with flooding in a geographical region, comprising the steps of:
   defining a geographical region on the computer;
   dividing the geographical region into a plurality of grid cells;
   identifying data relating to characteristics of the geographic region within the plurality of grid cells, the characteristics including (i) a vertical distance of each grid cell to a relevant river grid cell, (ii) a horizontal distance of each grid cell to a relevant river grid cell, and (iii) a catchment area at each relevant river grid cell;
   determining, using the data from said identifying, a probability of an occurrence of a flood-related event by the computer in a selected grid cell in a defined recurrence interval using a regression model that uses the characteristics (i), (ii) and (iii) as observed values in the regression model; and
   using a result of said determining to calculate an insurance premium on the computer for a risk located within a portion of the geographical region that includes the selected grid cell;
   wherein the regression model uses at least the following linear model, $$\text{logit}(p) = b_0 + b_1 \text{VDIST} + b_2 \text{HDIST} + b_3 \text{AREA}$$

wherein p is the probability that the selected grid cell is flooded in the defined recurrence interval, VDIST is the vertical distance of each grid cell to the relevant river grid cell, HDIST is the horizontal distance of grid cell to the relevant river grid cell, AREA is the catchment area at the relevant river grid cell, and $b_0$, $b_1$, $b_2$ and $b_3$ are regression coefficients of the regression model that are calibrated based on a climate type of the geographic region.

2. The method according to claim 1, wherein said defined recurrence interval is defined in years and falls between 50 and 500 years.

3. The method according to claim 1, wherein said defined recurrence interval is 100 years.

4. The method according to claim 1, further comprising a step of:
   calculating for each grid cell whether it is considered to be flooded in the defined recurrence interval if p resulting from said step of determining is greater than a predefined threshold value.

5. A computer method of evaluating risks associated with flooding, comprising the steps of:
   defining a first geographical region on the computer;
   inputting first data relating to the first geographical region into the computer, the first data including (i) a vertical distance of each grid cell to a relevant river grid cell, (ii) a horizontal distance of each grid cell to a relevant river grid cell, and (iii) a catchment area at each relevant river grid cell;
   developing a model to determine a probability of recurrence of flood-related events in the first geographical region on the computer for a defined recurrence interval by using a regression model that uses the characteristics (i), (ii) and (iii) as observed values in the regression model
   calibrating regression coefficients of the regression model by reference to an alternative source of information regarding an occurrence of flood-related events in the first geographical region;
   defining a second geographical region on the computer;
   inputting second data relating to the second geographical region into the computer, the second data including (i) a vertical distance of each grid cell to a relevant river grid cell, (ii) a horizontal distance of each grid cell to a relevant river grid cell, and (iii) a catchment area at each relevant river grid cell; and
   applying the regression model by using the second data as observed values in the regression model to determine a probability of occurrence of flood-related events by the computer in the second geographical region for the defined recurrence interval;
   wherein the regression model uses at least the following linear model, $$\text{logit}(p) = b_0 + b_1 \text{VDIST} + b_2 \text{HDIST} + b_3 \text{AREA}$$

wherein p is the probability that the selected grid cell is flooded in the defined recurrence interval, VDIST is the vertical distance of each grid cell to the relevant river grid cell, HDIST is the horizontal distance of grid cell to the relevant river grid cell, AREA is the catchment area at the relevant river grid cell, and $b_0$, $b_1$, $b_2$ and $b_3$ are regression coefficients of the regression model that are calibrated based on a climate type of the respective geographic region.

6. The computer method of claim 5, further comprising the step of:
   dividing the first and second geographical regions into a plurality of grid cells.

7. The computer method of claim 5, wherein said defined recurrence interval is 100 years.

8. A method of evaluating risks associated with flooding in a geographical region performed on a computer, comprising the steps of:
- defining an area to include a catchment area of a river flowing through the region on the computer;
- dividing at least a portion of the area into a plurality of grid cells;
- identifying data relating to characteristics of the area within one or more of the grid cells, the data including (i) a vertical distance of each grid cell to a relevant river grid cell, and (ii) a horizontal distance of each grid cell to a relevant river grid cell; and
- determining, by using a regression model that uses data from said identifying and data on the catchment area of the river as observed values, a probability of occurrence of a flood event by the computer in a selected grid cell for a defined recurrence interval;
- wherein the regression model uses at least the following linear model, $$\text{logit}(p) = b_0 + b_1 VDIST + b_2 HDIST + b_3 AREA$$

wherein p is the probability that the selected grid cell is flooded in the defined recurrence interval, VDIST is the vertical distance of each grid cell to the relevant river grid cell, HDIST is the horizontal distance of grid cell to the relevant river grid cell, AREA is the catchment area at the relevant river grid cell, and $b_0$, $b_1$, $b_2$ and $b_3$ are regression coefficients of the regression model that are calibrated based on a climate type of the geographic region.

9. The method according to claim 8, further comprising the step of:
- calculating for each grid cell whether it is considered to be flooded in the defined recurrence interval if p resulting from said step of determining is greater than a predefined threshold value.

10. The method according to claim 9, wherein said threshold value is changed to redefine the recurrence interval to a different recurrence interval.

11. The method according to claim 8, wherein said model is calibrated by reference to a second geographical region.

12. A method of evaluating risks associated with flooding in a geographical region performed on a computer, comprising the steps of:
- defining an area to include a catchment area of a river flowing through the region on the computer;
- dividing at least a portion of the area into a plurality of grid cells;
- identifying data relating to characteristics of the area within one or more of the grid cells, the data including (i) a vertical distance of each grid cell to a relevant river grid cell, and (ii) a horizontal distance of each grid cell to a relevant river grid cell;
- determining, by using a regression model that uses data (i) and (ii) from said identifying and data on the catchment area of the river as observed values, a probability of occurrence of a flood event by the computer in a selected grid cell for a first recurrence interval; and
- using a result of said determining to calculate a probability of occurrence of a flood event on the computer in the selected grid cell for a second recurrence interval;
- wherein the regression model uses at least the following linear model, $$\text{logit}(p) = b_0 + b_1 VDIST + b_2 HDIST + b_3 AREA$$

wherein p is the probability that the selected grid cell is flooded in the defined recurrence interval, VDIST is the vertical distance of each grid cell to the relevant river grid cell, HDIST is the horizontal distance of grid cell to the relevant river grid cell, AREA is the catchment area at the relevant river grid cell, and $b_0$, $b_1$, $b_2$ and $b_3$ are regression coefficients of the regression model that are calibrated based on a climate type of the geographic region.

13. The method according to claim 12, wherein said first recurrence interval is 100 years.

14. The method according to claim 12, wherein said step of determining a probability of occurrence of a flood event in a selected grid cell for a first recurrence interval includes the step of selecting a threshold probability associated with said first recurrence interval.

15. The method according to claim 13, wherein the step of determining a probability of occurrence of a flood event in the selected grid cell for a second recurrence interval includes the step of selecting a probability threshold associated with said second recurrence interval.

* * * * *